United States Patent
Imai et al.

(10) Patent No.: US 7,356,140 B2
(45) Date of Patent: Apr. 8, 2008

(54) ENCRYPTING DEVICE, DECRYPTING DEVICE, CRYPTOSYSTEM INCLUDING THE SAME DEVICES, ENCRYPTING METHOD, AND DECRYPTING METHOD

(75) Inventors: Shigeki Imai, Nara (JP); Tomoyuki Nagai, Tenri (JP); Hatsukazu Tanaka, 2-467-302, 4-chome Nakaochiai, Suma-ku, Kobe-shi, Hyogo (JP) 654-0154

(73) Assignees: Sharp Kabushiki Kaisha, Osaka (JP); Hatsukazu Tanaka, Hyogo (JP)

( * ) Notice: Subject to any disclaimer, the term of this patent is extended or adjusted under 35 U.S.C. 154(b) by 625 days.

(21) Appl. No.: 10/763,389

(22) Filed: Jan. 26, 2004

(65) Prior Publication Data
US 2004/0208317 A1 Oct. 21, 2004

(30) Foreign Application Priority Data
Jan. 24, 2003 (JP) ............................. 2003-016761
Jan. 21, 2004 (JP) ............................. 2004-013401

(51) Int. Cl.
*H04L 9/30* (2006.01)

(52) U.S. Cl. ........................................ 380/30; 380/44

(58) Field of Classification Search ................. 380/44, 380/30
See application file for complete search history.

(56) References Cited

U.S. PATENT DOCUMENTS
6,081,598 A * 6/2000 Dai ............................. 380/28

FOREIGN PATENT DOCUMENTS
JP 8-251155 9/1996
JP 2000-214777 8/2000

* cited by examiner

*Primary Examiner*—Gilberto Barrón, Jr.
*Assistant Examiner*—Cordelia Kane
(74) *Attorney, Agent, or Firm*—Nixon & Vanderhye, PC

(57) ABSTRACT

A cryptosystem includes an encrypting device, a communication path, and a decrypting arithmetic device. Key generation means in the encrypting device generate a public key $\{g_1, g_2\}$ as random numbers respectively including the power of (p−1) and the power of (q−1) and decrypt a message m using the Fermat's little theorem and the Chinese remainder theorem. This makes it possible to suggest an extremely simple cryptosystem, which is simplified by reducing the amount of computations for encryption and decryption and enables encryption and decryption by simple calculations, while maintaining a security equivalent to the RSA encryption scheme.

13 Claims, 3 Drawing Sheets

$C_1 = (C_{11}, C_{12})$, $C_{11} = m_1 R_1 \pmod{n}$, $C_{12} = m_1 R_2 \pmod{n}$
$C_i = m_i \oplus R_{b_i+1}$; $b_i = 0 \text{ or } 1 \in m_1$, $2 \leq i \leq k < \lfloor \log_2 n \rfloor$

ENCRYPTING DEVICE, DECRYPTING DEVICE, CRYPTOSYSTEM INCLUDING THE SAME DEVICES, ENCRYPTING METHOD, AND DECRYPTING METHOD

This Nonprovisional application claims priority under 35 U.S.C. § 119(a) on Patent Application No. 16761/2003 filed in Japan on Jan. 24, 2003, and Patent Application No. 13401/2004 filed in Japan on Jan. 21, 2004, the entire contents of which are hereby incorporated by reference.

FIELD OF THE INVENTION

The present invention relates to an encrypting device for encrypting messages transmitted and received over the Internet or the like, a decrypting device for decrypting encrypted messages, and a cryptosystem including the encrypting device and the decrypting device.

BACKGROUND OF THE INVENTION

Conventionally, there has been the problem of leakage and tampering of data and others exchanged over the Internet or the like. For the solution to this problem, a cryptosystem of encrypting data and others to transmit it to the receiving end has been adopted.

The cryptosystem is classified into a common-key cryptosystem and a public-key cryptosystem. The public-key cryptosystem is mainly adopted because of easier key management, lower risk of data leakage, and other reasons.

The typical example of the public-key cryptosystem is the RSA encryption scheme.

The RSA encryption scheme is a public-key cryptosystem using as one of public keys a product n=pq, where p and q are prime numbers generated as a substantial private key, and employing the nature of the easiness of finding n from p and q, but the difficulty of finding two prime numbers p and q from n.

Thus, by publicly revealing n as one of public keys, everyone can generate a ciphertext, but it is very difficult to find two large prime numbers p and q for decryption of the ciphertext. From this point, it can be said that security of data transmitted by the RSA encryption scheme is extremely high.

However, although the conventional RSA encryption scheme as described above has a high performance in terms of data secrecy and has a simple algorithm, its security depends on the difficulty of factoring a product n of two prime numbers p and q. Therefore, it is necessary to use about 200-digit n in the decimal system, and there is the problem that it is very difficult to perform modulo n exponentiation, which are necessary for encryption and decryption processes.

Moreover, the RSA encryption scheme is of a multiplicative property, which results in a security problem that three signatures can be generated from two signatures.

SUMMARY OF THE INVENTION

An object of the present invention is to suggest a secret cryptosystem of an extremely simple public key, which simplifies its algorithm, while maintaining a security equivalent to the RSA encryption scheme, and to provide an encrypting device which can perform encryption by simple calculations, a decrypting device which can perform decryption by simple calculations, a cryptosystem including the same devices, an encrypting method, and a decrypting method.

In order to achieve the above object, an encrypting device of the present invention includes:

key generation means for generating two prime numbers p and q of which product is n=pq as a private key and generating as a public key $g_1$ and $g_2$ respectively given by the following Equations (1) and (2) using two random numbers s and t and a maximal generator g in a multiplicative group of integers modulo n; and encrypting arithmetic means for, in response to receipt of a plaintext m, generating a ciphertext $C=(C_1, C_2)$ respectively given by the following Equations (3) and (4) using the public key $\{g_1, g_2\}$, a private key n, and random numbers r1 and r2, $$g_1 = g^{s(p-1)} (\mathrm{mod}\ n), \qquad (1)$$

$$g_2 = g^{t(q-1)} (\mathrm{mod}\ n), \qquad (2)$$

$$C_1 = m \cdot g_1^{r1} (\mathrm{mod}\ n), \qquad (3)$$

$$C_2 = m \cdot g_2^{r2} (\mathrm{mod}\ n), \qquad (4)$$

where $\gcd\{s, q-1\}=1$ and $\gcd\{t, p-1\}=1$.

According to the above arrangement, keys $g_1$ and $g_2$ generated as a public key respectively include the power of (p−1) and the power of (q−1), and the ciphertext elements $C_1$ and $C_2$ generated using the public key $\{g_1, g_2\}$ and the private key n also include the power of (p−1) and the power of (q−1), respectively. This makes it possible to easily decrypt the ciphertext elements $C_1$ and $C_2$ using the Fermat's little theorem ($a^{p-1} \equiv 1\ (\mathrm{mod}\ p)$).

That is, the encrypting device of the present invention causes the key generation means to generate two large prime numbers p and q as a private key and to generate the public key $\{g_1, g_2\}$ so as to respectively include the power of (p−1) and the power of (q−1) by using the private key $\{p, q\}$ and the random numbers s and t.

This makes it possible to directly use the two large prime numbers p and q as a private key and to compute the public key $\{g_1, g_2\}$ by very simple calculations including the power of (p−1) using a random number.

Further, the ciphertext elements generated by the encrypting arithmetic means in the encrypting device of the present invention are given by the equations respectively including the power of (p−1) and the power of (q−1) using the public key $\{g_1, g_2\}$ and the private key n, so that it is possible to decrypt the ciphertext using the Fermat's little theorem.

The Fermat's little theorem is given by $a^{p-1} \equiv 1\ (\mathrm{mod}\ p)$, and a number including the power of (p−1) modulo p is calculated, thereby reducing its remainder to "1". Therefore, it is possible to compute two received ciphertexts corresponding to ciphertext elements $C_1$ and $C_2$ from the ciphertext elements $C_1$ and $C_2$ using the Fermat's little theorem and to decrypt the plaintext m from the two received ciphertexts using the Chinese remainder theorem.

In the encrypting device of the present invention, as described above, it is possible to generate the public key $\{g_1, g_2\}$ and the private key n by simple calculations using a simple private key $\{p, q\}$, to generate a ciphertext by simple calculations, and to decrypt the ciphertext by simple calculations using the Fermat's little theorem, thus enabling higher-speed processing as compared to the conventional encryption scheme.

Meanwhile, in terms of security of the encrypting device of the present invention, the public key $\{g_1, g_2\}$ include random numbers s and t, respectively, so that the public key {$g_1$, $g_2$} and the private key n are independent from each other.

Consequently, according to the encrypting device of the present invention, it is possible to perform encryption and decryption at high speed by reducing the amount of computations while maintaining a high security.

In order to achieve the above object, another encrypting device of the present invention includes:

key generation means for generating prime numbers p and q of which product is n=pq, where p is a private key, and generating as a public key $g_1$ given by the following Equation (1) using a random number s and a maximal generator g in a multiplicative group of integers modulo n; and encrypting arithmetic means for, in response to receipt of a plaintext m, generating a ciphertext C given by the following Equation (3)' using the public key $g_1$, a private key n, and a random number r, $$g_1 = g^{s(p-1)} (\text{mod } n), \qquad (1)$$

$$C = m \cdot g_1^r (\text{mod } n), \qquad (3)'$$

where when public information b is a size of p (bits), $0 < m < 2^{b-1}$ and gcd{s, q−1}=1.

According to the above arrangement, a key $g_1$ generated as a public key includes the power of (p−1), and the ciphertext C generated using the public key $g_1$ also include the power of (p−1). This makes it possible to easily decrypt the ciphertext C using the Fermat's little theorem ($a^{p-1} \equiv 1$ (mod p)).

That is, the encrypting device of the present invention causes the key generation means to generate two large prime numbers p and q as a private key and to generate the public key $g_1$ so as to include the power of (p−1) by using the private key {p, q} and the random numbers s and t.

As to the relation between the private key p and the size b, by limiting a length of the message m, and using this size b, it is possible to perform computation for the generation of a ciphertext and computation for decryption each by one equation, thus enabling encryption and decryption processes by simpler calculations without using the Chinese remainder theorem.

Further, as in the above arrangement, the ciphertext generated by the encrypting arithmetic means in the encrypting device of the present invention is given by the equation including the power of (p−1) using the public key $g_1$ and the private key n, so that it is possible to use the Fermat's little theorem for decryption of the ciphertext.

The Fermat's little theorem is given by $a^{p-1} \equiv 1$ (mod p), and a number including the power of (p−1) modulo p is calculated, thereby reducing its remainder to "1".

Therefore, it is possible to generate the public key $g_1$ by simple calculations using a simple private key {p, q}, to generate a ciphertext by simple calculations, and to decrypt the ciphertext by simple calculations only using the Fermat's little theorem, thus enabling further higher-speed processing as compared to the conventional encryption scheme.

Meanwhile, in terms of security of the encrypting device of the present invention, the public key $g_1$ includes a random number s, so that the public key $g_1$ are independent from each other.

Consequently, according to the encrypting device of the present invention, it is possible to realize high-speed encryption and decryption processes by reducing the amount of computations in such a manner limitations are imposed on the length of the plaintext m while maintaining a high security.

In order to achieve the above object, in a decrypting device of the present invention, included are decrypting arithmetic means for receiving a ciphertext C=($C_1$, $C_2$), which is an encrypted plaintext m, respectively given by the following Equations (3) and (4) using a public key {$g_1$, $g_2$}, a private key n, and random numbers r1 and r2, the private key n being n=pq where p and q are prime numbers generated as a private key, $g_1$ and $g_2$ being respectively given by the Equations (1) and (2) using two random numbers s and t and a maximal generator g in a multiplicative group of integers modulo n, and performing decryption in such a manner so as to generate received ciphertexts a and b respectively given by the following Equations (5) and (6) using the Fermat's little theorem and then derive the plaintext m satisfying the following Equation (7) from the received ciphertexts a and b using the Chinese remainder theorem, $$g_1 = g^{s(p-1)} (\text{mod } n), \qquad (1)$$

$$g_2 = g^{t(q-1)} (\text{mod } n), \qquad (2)$$

$$C_1 = m \cdot g_1^{r1} (\text{mod } n), \qquad (3)$$

$$C_2 = m \cdot g_2^{r2} (\text{mod } n), \qquad (4)$$

$$a = C_1 (\text{mod } p) = m (\text{mod } p), \qquad (5)$$

$$b = C_2 (\text{mod } q) = m (\text{mod } q), \qquad (6)$$

$$m = aAq + bBp (\text{mod } n), \qquad (7)$$

where gcd{s, q−1}=1, gcd{t, p−1}=1, Aq (mod p)=1, and Bp (mod q)=1.

According to the above arrangement, keys $g_1$ and $g_2$ generated as a public key respectively include the power of (p−1) and the power of (q−1), and the ciphertext elements $C_1$ and $C_2$ generated using the public key {$g_1$, $g_2$} and the private key n also include the power of (p−1) and the power of (q−1), respectively. This makes it possible to easily decrypt the ciphertext elements $C_1$ and $C_2$ using the Fermat's little theorem ($a^{p-1} \equiv 1$ (mod p)).

That is, the ciphertext received by the decrypting device of the present invention is given by the equations respectively including the power of (p−1) and the power of (q−1) using the public key {$g_1$, $g_2$} and the private key n, so that it is possible to decrypt the ciphertext using the Fermat's little theorem.

The Fermat's little theorem is given by $a^{p-1} \equiv 1$ (mod p), and a number including the power of (p−1) modulo p is calculated, thereby reducing its remainder to "1". Therefore, it is possible to compute two received ciphertexts corresponding to ciphertext elements $C_1$ and $C_2$ from the ciphertexts $C_1$ and $C_2$ using the Fermat's little theorem and to decrypt the plaintext m from the two received ciphertexts using the Chinese remainder theorem.

As described above, the decrypting device of the present invention can decrypt a ciphertext easily using the Fermat's little theorem, thus enabling higher-speed decryption, as compared to the conventional decryption scheme.

Further, in order to achieve the above object, in another decrypting device of the present invention, included are decrypting arithmetic means for receiving a ciphertext C of an inputted plaintext m, given by the following Equation (3)' using a public key $g_1$ a private key n, and a random number r, the private key n being n=pq where p and q are prime numbers, p being generated as a private key, $g_1$ being given by the following Equation (1) using a random number s and a maximal generator g in a multiplicative group of integers modulo n, and performing decryption in such a manner so as to derive the plaintext m satisfying the following Equation (8) using the Fermat's little theorem, $$g_1 = g^{s(p-1)} \pmod{n}, \tag{1}$$

$$C = m \cdot g_1^r \pmod{n}, \tag{3}'$$

$$m = C \pmod{p}, \tag{8}$$

where $\gcd\{s, q-1\} = 1$.

According to the above arrangement, the ciphertext C generated using the public key $g_1$ includes the power of (p−1). This makes it possible to easily decrypt the ciphertext C using the Fermat's little theorem ($a^{p-1} \equiv 1 \pmod{p}$).

That is, in the decrypting device of the present invention, as to the relation between the private key p and the size b, by limiting a length of the message m, and using this size b, it is possible to perform computation for the generation of a ciphertext and computation for decryption each by one equation, thus enabling decryption by simpler calculations without using the Chinese remainder theorem.

Further, the ciphertext decrypted by the decrypting device of the present invention is given by the equation including the power of (p−1) using the public key $g_1$, so that it is possible to use the Fermat's little theorem for decryption of the ciphertext.

The Fermat's little theorem is given by $a^{p-1} \equiv 1 \pmod{p}$, and a number including the power of (p−1) modulo p is calculated, thereby reducing its remainder to "1".

Therefore, it is possible to generate the public key $g_1$ and the private key n by simple calculations using a simple private key $\{p, q\}$, to generate a ciphertext by simple calculations, and to decrypt the ciphertext by simple calculations only using the Fermat's little theorem, thus enabling further higher-speed processing as compared to the conventional decryption scheme.

For a fuller understanding of the nature and advantages of the invention, reference should be made to the ensuing detailed description taken in conjunction with the accompanying drawings.

DESCRIPTION OF THE EMBODIMENTS

Embodiment 1

The following will describe one embodiment of an encrypting device, a decrypting device, a cryptosystem including the same devices, an encrypting method, and a decrypting method of the present invention with reference to drawings.

Figure 2:
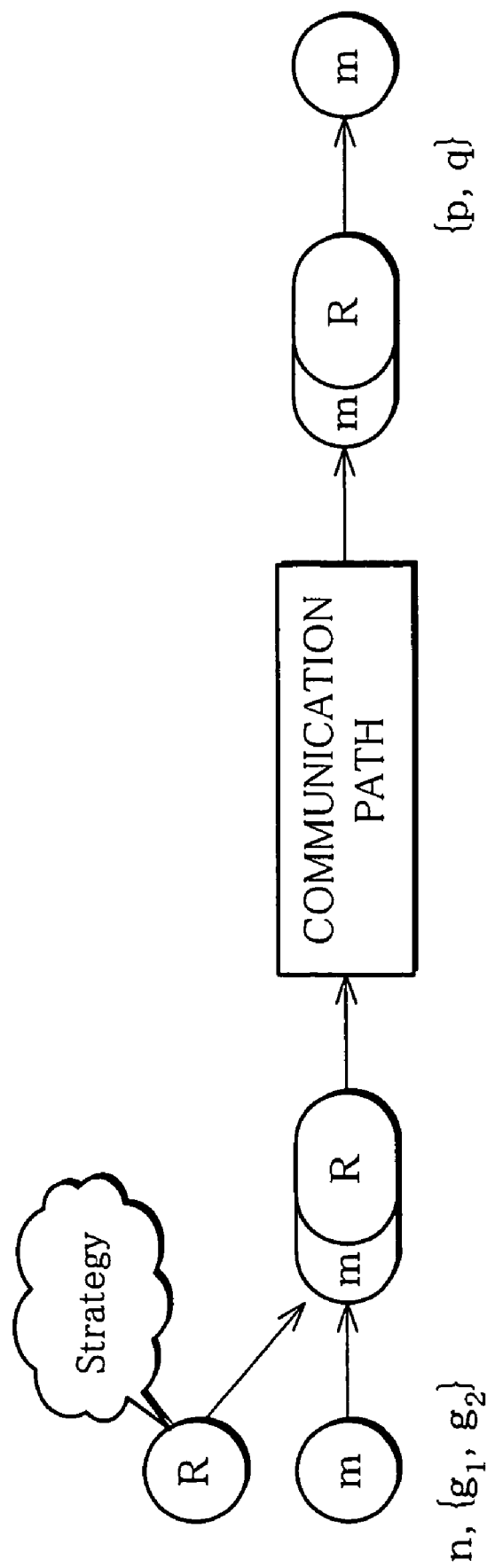
FIG. 2 is a block diagram showing a brief concept of encryption and decryption processes of the present invention.

A cryptosystem of the present embodiment performs encryption and decryption of a message (plaintext) m according to a basic concept as shown in FIG. 2.

That is, as shown in FIG. 2, the message (plaintext) m is multiplied by a random number R using a public key $\{g_1, g_2\}$ and a private key n to generate a ciphertext mR, and the ciphertext mR is transmitted to a receiving end of the message m. Then, the recipient of the ciphertext mR reduces the random number R to "1" using a private key $\{p, q\}$ to decrypt the message m.

Figure 1:
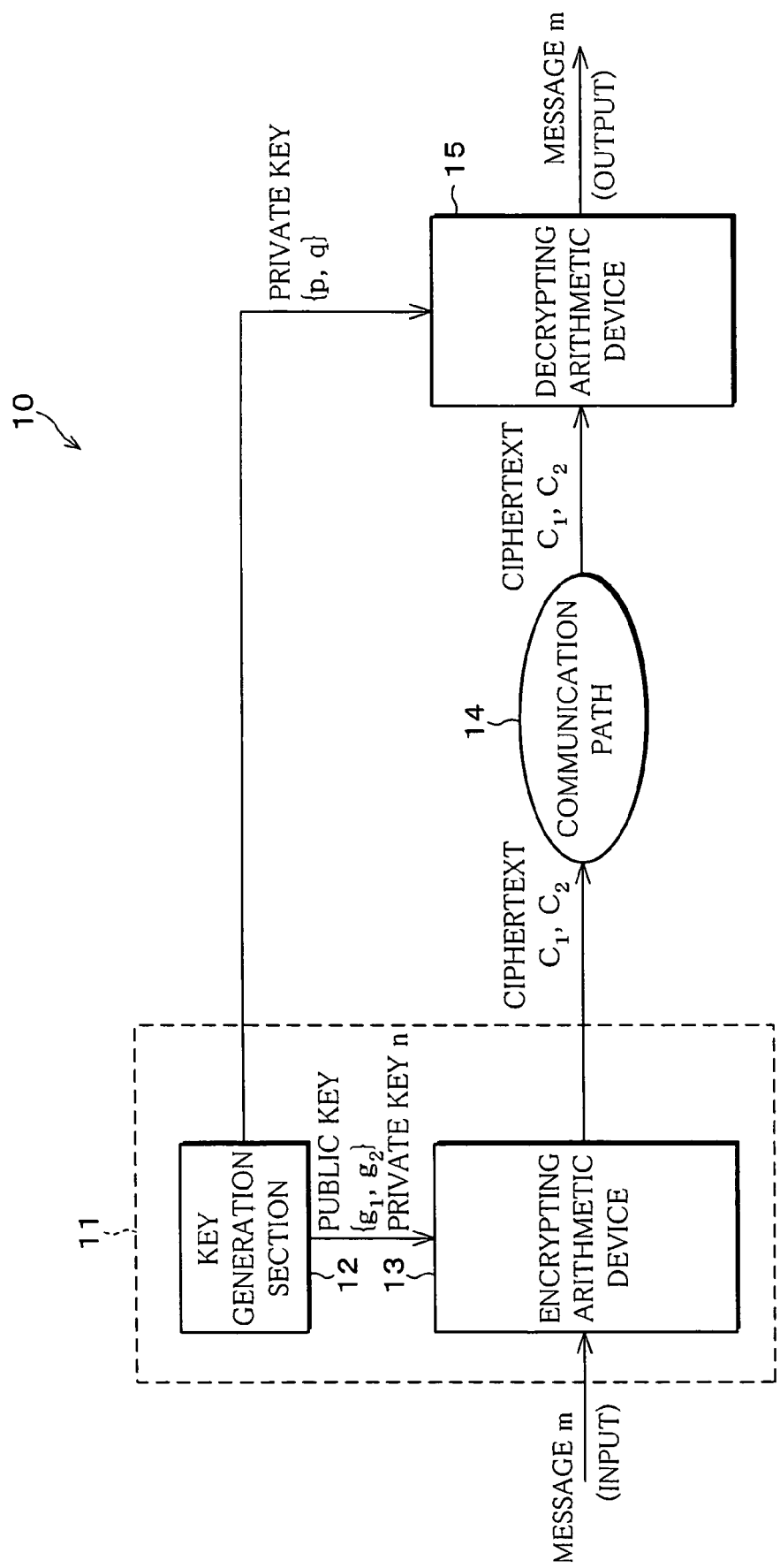
FIG. 1 is a block diagram showing a configuration of a cryptosystem of one embodiment of an encrypting device, a decrypting device, a cryptosystem including the same devices, an encrypting method, and a decrypting method of the present invention.

The cryptosystem, as shown in FIG. 1, includes an encrypting device (encrypting arithmetic means) 11, a communication path 14, and a decrypting arithmetic device (decrypting arithmetic means) 15.

Further, the encrypting device 11 includes a key generation section 12 and an encrypting arithmetic device 13.

The key generating section 12 generates the public key $\{g_1, g_2\}$ and the private key $\{p, q\}$ used for encryption and decryption of the message m, respectively. Note that, the generation of the public key $\{g_1, g_2\}$ and the private key $\{p, q\}$ will be described in details later.

The encrypting arithmetic device 13 encrypts an inputted message m using the public key $\{g_1, g_2\}$ and a private key n to generate ciphertext elements $C_1$ and $C_2$, and outputs the generated ciphertext elements $C_1$ and $C_2$ to the communication path 14.

Here, the plaintext m is composed of $m_1, m_2, m_3, \ldots$, and the ciphertext C is composed of the ciphertext element $C_1$ to which the plaintext element $m_1$ is encrypted, the ciphertext element $C_2$ to which the plaintext element $m_2$ is encrypted, and the subsequent ciphertext elements encrypted in a similar manner.

The ciphertext element $C_1$ is composed of the ciphertext elements $C_{11}$ and $C_{12}$ respectively using the random numbers $R_1$ and $R_2$.

$$C_1 = (C_{11}, C_{12})$$

$$C_{11} = m_1 R_1 \pmod{n}$$

$$C_{12} = m_1 R_2 \pmod{n}$$

The actual procedure for the encryption begins with the generation of the ciphertext element $C_1 = (C_{11}, C_{12})$ to which only the plaintext element $m_1$, the first element in the plaintext m, is encrypted, and ciphertext elements following the ciphertext element $C_1$ are generated using the plaintext element $m_2$ and two random numbers $R_1$ and $R_2$.

$$C_2 = m_2 \oplus R_j (j = 1 \text{ or } 2)$$

Note that, a value of j is determined depending on bit information $b_1$ of $m_1 = (b_1, b_2, \ldots, b_k)$. Subsequently, $C_3, C_4, \ldots$ are generated in a similar manner.

The decrypting arithmetic device 15 receives the ciphertext elements $C_1$ and $C_2$ via the communication path 14 and receives the private key $\{p, q\}$ from the key generation section 12. Then, the decrypting arithmetic device 15 decrypts the ciphertext elements $C_1$ and $C_2$ into the message m and output the message m.

Thus, the message m is encrypted using the public key $\{g_1, g_2\}$ and the private key n to transmit it in the form of the ciphertext elements $C_1$ and $C_2$, and on the receiving end, the ciphertext elements $C_1$ and $C_2$ are decrypted into the message m using the private key $\{p, q\}$, thereby preventing the occurrence of problems such as leakage and tampering of the message m in the communication path 14, thus enabling a highly secure communication.

Here, the following will describe encryption process and decryption process of the message m in the cryptosystem 10 of the present embodiment.

The following will first describe the generation of the public key $\{g_1, g_2\}$ by the key generation section 12.

Let p and q, as private key, be prime numbers of which product is n=pq, g be a maximal generator in the multiplicative group of integers modulo n, and s and t be random numbers which satisfy gcd$\{s, q-1\}$=1 and gcd$\{t, p-1\}$, respectively. The key generation section 12 generates the public key $\{g_1, g_2\}$ as random numbers given by the following Equations (1) and (2):

$$g_1 = g^{s(p-1)} (\mathrm{mod}\ n), \quad (1)$$

$$g_2 = g^{t(q-1)} (\mathrm{mod}\ n). \quad (2)$$

Here, because the Equations (1) and (2) includes random numbers s and t, respectively, the equation n=pq and the Equations (1) and (2) are completely independent. Therefore, in order to derive the private key $\{p, q\}$ from the public key $\{g_1, g_2\}$, it is necessary to derive p and q by factoring "n" which is a product of the two large prime numbers p and q.

Next, the following will describe the generation of a ciphertext of the message m by the encrypting arithmetic device 13, using the public key $\{g_1, g_2\}$ given by the Equations (1) and (2), respectively.

Using the public key $\{g_1, g_2\}$ and the private key n, a ciphertext C=$\{C_1, C_2\}$ is given by the following equations:

$$C_1 = m \cdot g_1^{r_1} (\mathrm{mod}\ n), \quad (3)$$

$$C_2 = m \cdot g_2^{r_2} (\mathrm{mod}\ n), \quad (4)$$

where m is a message (plaintext) (m<n), and $r_1$ and $r_2$ are random numbers.

Since the ciphertext C includes random numbers $r_1$ and $r_2$ of the random numbers $g_1$ and $g_2$, as given by the Equations (3) and (4), the message m can be transmitted to the receiving end in the form of random numbers.

Note that, $g_1^{r_1}$ and $g_2^{r_2}$ respectively in the Equations (3) and (4) correspond to a random number R in a conceptual diagram shown in FIG. 2.

The following will describe decryption of the ciphertext elements $C_1$ and $C_2$ into the message m by the decrypting arithmetic device 15.

The decrypting arithmetic device 15 decrypts the ciphertext elements $C_1$ and $C_2$ into the message m using the private key $\{p, q\}$.

Here, in the cryptosystem of the present invention, a random number portion including the power of (p−1) can be reduced to "1" using the Fermat's little theorem ($a^{p-1} \equiv 1$ (mod p)), received ciphertexts a and b are generated as given by the following Equations (5) and (6):

$$a = C_1 (\mathrm{mod}\ p) = m (\mathrm{mod}\ p), \quad (5)$$

$$b = C_2 (\mathrm{mod}\ q) = m (\mathrm{mod}\ q). \quad (6)$$

Here, since the right sides of the Equations (5) and (6) are m>p and m>q, respectively, m(mod p) and m(mod q) are random numbers, and the message m is not completely decrypted.

In the cryptosystem of the present invention, the message m is decrypted using the Chinese remainder theorem according to the two Equations (5) and (6).

That is, by using the Chinese remainder theorem, the message m is given by the following Equation (7) according to the Equations (5) and (6):

$$m = aAq + bBp (\mathrm{mod}\ n) \quad (7)$$

where Aq(mod p)=1 and Bp(mod q)=1, so that it is obvious that the message m has been decrypted.

In the cryptosystem of the present invention, as described above, the public key $\{g_1, g_2\}$ respectively including the power of (p−1) and the power of (q−1) are generated so that the decryption using the Fermat's little theorem can be performed, and in decrypting, the message m is decrypted using the Fermat's little theorem and the Chinese remainder theorem.

With this arrangement, an extremely simple cryptosystem can be suggested because the public key $\{g_1, g_2\}$ can be generated by very simple calculations. Moreover, the two large prime numbers p and q can be directly used as the private key $\{p, q\}$. Further, since the message m can be decrypted by simple calculations using the Fermat's little theorem and the Chinese remainder theorem, the amount of necessary computations for encrypting can be less than that of a conventional RSA encryption scheme, thus obtaining a cryptosystem capable of a high-speed processing.

Second Embodiment

The following will describe another embodiment of an encrypting device, a decrypting device, a cryptosystem including the same devices, an encrypting method, and a decrypting method of the present invention.

The cryptosystem of the present embodiment, which has the same basic principle as that of the cryptosystem in the Embodiment 1, can make its algorithm simpler under the condition that a size b of a private key p is limited in relation to a message m.

That is, in the cryptosystem of the Embodiment 1 two ciphertext elements $C_1$ and $C_2$ are generated for one message m. However, in the cryptosystem of the present embodiment, one ciphertext C is generated by using the size b of the private key p, which is limited so as to satisfy $0 < m < 2^{b-1}$, and the message m can be decrypted simply by the ciphertext C. This allows for higher-speed encryption and decryption processes.

Specifically, an encrypting arithmetic device generates a random number r, and by using the size b of the private key p and the private key p, generates a public key $g_1$ and a ciphertext C respectively given by the following Equations (1) and (3)':

$$g_1 = g^{s(p-1)} (\mathrm{mod}\ n), \quad (1)$$

$$C = m \cdot g_1^r (\mathrm{mod}\ n), \quad (3)'$$

where the message m and the size b satisfy $0 < m < 2^{b-1}$.

Then, for the decryption of the ciphertext C, as in the case of the cryptosystem of the Embodiment 1, the decrypting arithmetic device derives the following Equation (8) using the Fermat's little theorem ($a^{p-1} \equiv 1$ (mod p)):

$$m = C (\mathrm{mod}\ p). \quad (8)$$

Here, since the ciphertext C includes $g_1$, and $g_1$ includes the power of (p−1) according to the Equation (1) of $g_1$ in the Embodiment 1, numbers except for m can be reduced to 1 by calculating modulo p, thus easily decrypting the message m.

In the cryptosystem of the present embodiment, as described above, the size b of the private key p is limited in relation to the message m. Then, the public key $g_1$ is generated, one ciphertext C is generated, and this ciphertext C is decrypted by using the private key p. Hence, decryption can be performed easily without using the Chinese remainder theorem, which is used in the Embodiment 1.

Therefore, it is possible to obtain a cryptosystem capable of a higher-speed processing than the cryptosystem of the Embodiment 1 while maintaining a security equivalent to the cryptosystem of the Embodiment 1.

Furthermore, the cryptosystem of the above-described present embodiment has the following characteristics.

The first characteristic is that the cryptosystem of the present embodiment, in which $g_1^{r1}$ is included in the Equations (3) and (4) expressing the ciphertext elements $C_1$ and $C_2$, adopts so-called probabilistic encryption that one message m is encrypted to different ciphertexts. This is a characteristic resulting from the power of "r" being a random number. In the RSA encryption scheme, the message m corresponds one-to-one with the ciphertext C. However, in the cryptosystem of the present embodiment, the message M does not correspond one-to-one with the ciphertext C, so that it is difficult to break the ciphertext C, thus enabling enhancement in cipher strength.

The second characteristic is a so-called one-way function that conversion from the message m into the ciphertext C is easy, but conversion from the ciphertext C into the message m is very difficult.

The third characteristic is that one generated ciphertext C may be derived from different original messages $m_0$ and $m_1$ because the message m does not correspond one-to-one with the ciphertext C, as described as the first characteristic. Therefore, it is difficult to know from the ciphertext C which message m has been encrypted, thus enabling enhancement in cipher strength.

Still further, the following will describe the security of the cryptosystem of the present invention against the following three types of attacks by an adversary.

The following will describe the security against Chosen-Plaintext Attack (CPA) as the first attack.

The chosen-plaintext attack, which is usually a process of generating a ciphertext, is an attack where an adversary constructs many pairs of a given plaintext (message) m and the corresponding ciphertext, and when a new ciphertext is given, the adversary finds out whether or not its plaintext can be recovered by comparing to the generated pairs, thereby obtaining a key to decrypt a ciphertext.

On the other hand, the cryptosystem of the present invention, as described above, is one-way function and probabilistic encryption, so that the message m does not correspond one-to-one with the ciphertext C. Therefore, it is obvious that the cryptosystem of the present invention is highly secure against this chosen-ciphertext attack.

The following will consider the security against Non-Adaptive Chosen-Ciphertext Attack (CCA1) as the second attack.

The non-adaptive chosen-ciphertext attack is an attack where an adversary constructs pairs of a given ciphertext and the corresponding plaintext, and when a target ciphertext is given, the adversary finds out whether or not its plaintext can be recovered by comparing to the generated pairs. Also, the non-adaptive chosen-ciphertext attack is an attack where the adversary is not allowed to send queries after she has sent a query for a target ciphertext that she wants to decrypt.

On the other hand, the cryptosystem of the present invention, as described above, is one-way function and probabilistic encryption, so that the message m does not correspond one-to-one with the ciphertext C. Therefore, it is obvious that the cryptosystem of the present invention is highly secure against this non-adaptive chosen-ciphertext attack.

The following will describe the security against Adaptive Chosen-Ciphertext Attack (CCA2) as the third attack.

The adaptive chosen-ciphertext attack is an attack where an adversary constructs pairs of a given ciphertext and the corresponding plaintext, and an adversary finds out whether or not a plaintext can be recovered by comparing to the generated pairs. Also, the adaptive chosen-ciphertext attack is an attack where the adversary is allowed to send any queries except for a target ciphertext she wants to decrypt at any time, and the adversary performs attacks repeatedly utilizing the previous result.

In the cryptosystem of the present invention, a target ciphertext is modified to another indistinguishable ciphertext, so that it is hard to say that the cryptosystem of the present invention is completely secure.

That is, let $C=(C_1, C_2)$ be a target ciphertext, and $C_1$ and $C_2$ are given as follows.

$$C_1 = m \cdot g_1^{r1} (\text{mod } n) \rightarrow C_1^* = m \cdot g_1^{r1+t1} (\text{mod } n),$$

$$C_2 = m \cdot g_2^{r2} (\text{mod } n), \rightarrow C_2^* = m \cdot g_2^{r2+t2} (\text{mod } n)$$

Although $C^*=(C_1^*, C_2^*)$ found here is $C^* \neq C$, a plaintext m can be obtained by presenting $C^*$. Therefore, the cryptosystem of the present invention cannot be said to be secure against the adaptive chosen-ciphertext attack.

In this connection, in the cryptosystem of the present embodiment, $C=(C_1, C_2, e)$ is provided so that the cryptosystem of the present embodiment becomes tolerable for the adaptive chosen-ciphertext attack.

Note that, "e" is e=h(d) (h is one-way hash function) because $d=(C_1+C_2)/m$ (mod n) where $C_1=m \cdot g_1^{r1}$ (mod n) and $C_2=m \cdot g_2^{r2}$ (mod n).

This causes the problem of a long ciphertext C. However, since "e" can be 32 bits or 64 bits in length, and "e" changes if only a little change of the message m occurs. Therefore, the cryptosystem of the present embodiment can be tolerable for the adaptive chosen-ciphertext attack, thus obtaining a highly reliable cryptosystem.

Note that, the cryptosystem of the present invention can provide higher-speed computations by using a database given below:

$$DB(2,e)=[R_{ij}=g_i^{rij}(\text{mod } n)] \text{ (where } 1 \leq i \leq 2, 1 \leq j \leq e).$$

$$C=((C_1, C_2)$$

$$C_1 = m \prod_{k=1}^{\delta 1} R_{1,jk} \ (\text{mod } n)$$

$$C_2 = m \prod_{l=1}^{\delta 2} R_{1,jl} \ (\text{mod } n)$$

That is, a pre-computed $R_{ij}$ is saved in database with two rows and e columns so that, in encrypting, $R_{ij}$ is selected from this database to generate a random number portion, thus realizing higher-speed encryption process.

With this arrangement, it is possible to perform encryption process at higher speed, as compared to the conventional RSA encryption scheme with large amount of computations, for example. In addition, decryption can be performed only by calculation of modulo p, so that it is possible to perform decryption at higher speed, as compared to the conventional RSA encryption scheme with large amount of computations.

Figure 3:
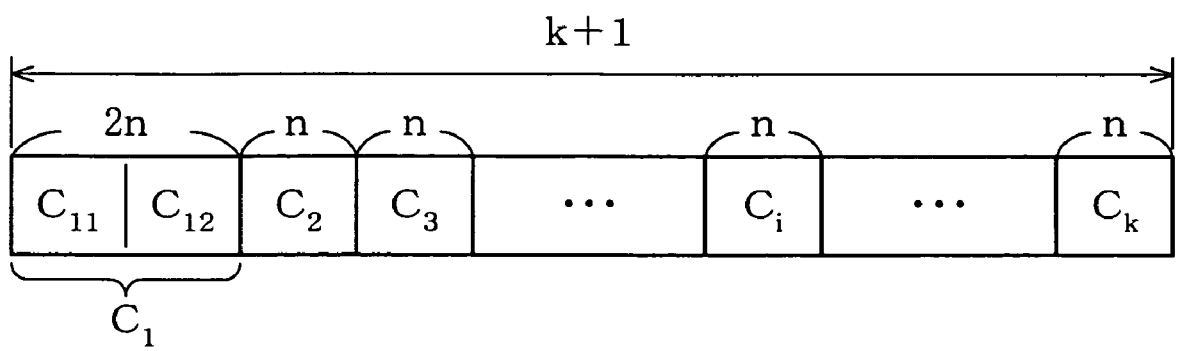
FIG. 3 is a view showing an extended block cipher as an application of the cryptosystem of the present invention.

Further, the cryptosystem of the present invention can be applied to an extended block cipher as shown in FIG. 3, using an exponential property.

For the extended block cipher, only a ciphertext element $C_1$ is encrypted to ciphertext elements $C_{11}$ and $C_{12}$ by an ordinary skill. The subsequent ciphertext elements of $C_2$ are generated by using two random numbers $R_1$ and $R_2$ respectively included in the ciphertext elements $C_{11}$ and $C_{12}$. Therefore, it is possible to perform higher-speed processing in the conventional common-key cryptosystem and public-key cryptosystem.

Specifically, only for the first ciphertext element $C_1$, the ciphertext elements $C_{11}$ and $C_{12}$ are generated by an ordinary procedure. For the subsequent ciphertext elements of $C_2$, if a first bit $b_i=0$, a random number portion $R_1$ is added, or if a first bit $b_i=1$, a random number portion $R_2$ is added, thereby generating a ciphertext C.

TABLE 1

| | <Encryption> | |
| --- | --- | --- |
| | Exponentiation | Multiplication |
| Original | 2 | 2 |
| Extended | 2/k | 2/k |
| | <Decryption> | |
| | Division | Multiplication |
| Original | 2 | 2 |
| Extended | 4/k | 2/k | unit (times)

Table 1 shows how many times computations can be decreased by the extended block cipher shown in FIG. 3.

In the encryption process, as shown in an upper section of Table 1, the number of times to be computed can be decreased to 2/k times for both exponentiation and multiplication, where k is block length.

In the decryption processing, as shown in an lower section of Table 1, the number of times to be computed can be decreased to 4/k times for division and to 2/k times for multiplication, where k is block length.

As described above, the cryptosystem of the present invention is applied to an extended block cipher as an example of application, whereby it is possible to obtain a hybrid cryptosystem capable of high-speed processing with a fewer number of times to be computed.

Note that, when the simplified cryptosystem according to the Embodiment 2 is applied to this extended block cipher, the number of times to be computed is decreased to once for all types of computations, and hence a very convenient cryptosystem can be obtained.

Further, the following will describe a case when the cryptosystem of the present invention is applied to digital signature.

First, let $\alpha$ and $\beta$ be respective powers of $s(p-1)$ and $t(q-1)$ of a public key $\{g_1, g_2\}$, and a signature $(u, v)$ is given by the following equations:

$$u = \alpha r + \beta m \pmod{\Phi(n)}, \quad (12)$$

$$v = g^t(\alpha^2 r + \beta^2) \pmod{n}, \quad (13)$$

where m is a message, $m \leq Me \leq \Phi(n)$, and r is a random number.

In the Equation (12), u includes three or more unknown variables, so that it is impossible to solve the Equation (12). Moreover, in the Equation (13), v includes g, $\alpha$, $\beta$, and r all of which are secret variables, so that it is impossible to solve the Equation (13).

A verification equation of a signed message $\{m, (u, v)\}$ is given by the following equation:

$$(g_1^m \cdot g_2)^u = v^m \pmod{n}. \quad (14)$$

Next, the Equation (14) is verified.

$$(g_1^m \cdot g_2)^u = g^{(\alpha m + \beta)(\alpha r + \beta m)} \pmod{n}$$
$$= g^{(\alpha^2 r + \beta^2)m} \pmod{n}$$
$$= v^m \pmod{n}$$

where $g^{\alpha\beta} = g^{st(p-1)(q-1)} = g^{st\Phi(n)} = 1 \pmod{n}$.

From this result, it is verified that the signed message $\{m, (u, v)\}$ is the message m transmitted from a signer.

As described above, the cryptosystem of the present invention, which is a new system different from the conventional system, is highly secure, and it is possible to suggest a digital signature capable of high-speed processing.

Note that, an encrypting device, a decrypting device, a cryptosystem including the same devices, an encrypting method, and a decrypting method of the present invention can be applied to, for example, entity authentication, two-way authentication, electronic election, and electronic bidding.

A cryptosystem of the present invention can be also expressed without using any equations as follows: a cryptosystem including: an encrypting device which uses two large prime numbers p and q as a private key and generates a ciphertext $C=(C_1, C_2)$ using a public key $\{g_1, g_2\}$ and a private key n, the private key n being a product of the prime numbers p and q, $g_1$ including the power of $(p-1)$ and a random number s, and $g_2$ including the power of $(q-1)$ and a random number t; and a decrypting device which decrypts the ciphertext C using the Fermat's little theorem.

Note that, the encryption technique of the present invention can be applied to a scrambler or a descrambler of streaming data in a small area inside a house.

Further, the present invention can be applied to distribution of encryption keys.

The present invention is not limited to the aforementioned embodiments and is susceptible of various changes within the scope of the accompanying claims. An embodiment obtained by suitable combinations of technical means disclosed in the different embodiments also fall within the technical scope of the present invention.

As described above, an encrypting device of the present invention includes:

key generation means for generating two prime numbers p and q of which product is n=pq as a private key and generating as a public key $g_1$ and $g_2$ respectively given by the following Equations (1) and (2) using two random numbers s and t and a maximal generator g in a multiplicative group of integers modulo n; and encrypting arithmetic means for, in response to receipt of a plaintext m, generating a ciphertext $C=(C_1, C_2)$ respectively given by the following Equations (3) and (4) using the public key $\{g_1, g_2\}$, a private key n, and random numbers r1 and r2, $$g_1 = g^{s(p-1)} \pmod{n}, \quad (1)$$

$$g_2 = g^{t(q-1)} \pmod{n}, \quad (2)$$

$$C_1 = m \cdot g_1^{r1} \pmod{n}, \quad (3)$$

$$C_2 = m \cdot g_2^{r2} \pmod{n}, \quad (4)$$

where $\gcd\{s, q-1\}=1$ and $\gcd\{t, p-1\}=1$.

According to the above arrangement, keys $g_1$ and $g_2$ generated as a public key respectively include the power of (p−1) and the power of (q−1), and the ciphertext elements $C_1$ and $C_2$ generated using the public key $\{g_1, g_2\}$ and the private key n also include the power of (p−1) and the power of (q−1), respectively. This makes it possible to easily decrypt the ciphertext elements $C_1$ and $C_2$ using the Fermat's little theorem ($a^{p-1} \equiv 1 \pmod{p}$).

That is, the encrypting device of the present invention causes the key generation means to generate two large prime numbers p and q as a private key and to generate the public key $\{g_1, g_2\}$ so as to respectively include the power of (p−1) and the power of (q−1) by using the private key $\{p, q\}$ and the random numbers s and t.

This makes it possible to directly use the two large prime numbers p and q as a private key and to compute the public key $\{g_1, g_2\}$ by very simple calculations including the power of (p−1) using a random number.

Further, the ciphertext generated by the encrypting arithmetic means in the encrypting device of the present invention is given by the equations respectively including the power of (p−1) and the power of (q−1) using the public key $\{g_1, g_2\}$ and the private key n, so that it is possible to decrypt the ciphertext using the Fermat's little theorem.

The Fermat's little theorem is given by $a^{p-1} \equiv 1 \pmod{p}$, and a number including the power of (p−1) modulo p is calculated, thereby reducing its remainder to "1". Therefore, it is possible to compute two received ciphertexts corresponding to ciphertext elements $C_1$ and $C_2$ from the ciphertext elements $C_1$ and $C_2$ using the Fermat's little theorem and to decrypt the plaintext m from the two received ciphertexts using the Chinese remainder theorem.

In the encrypting device of the present invention, as described above, it is possible to generate the public key $\{g_1, g_2\}$ by simple calculations using a simple private key $\{p, q\}$, to generate a ciphertext by simple calculations, and to decrypt the ciphertext by simple calculations using the Fermat's little theorem, thus enabling higher-speed processing as compared to the conventional encryption scheme.

Meanwhile, in terms of security of the encrypting device of the present invention, the public key $\{g_1, g_2\}$ include random numbers s and t, respectively, so that the public key $\{g_1, g_2\}$ and the private key n are independent from each other.

Consequently, according to the encrypting device of the present invention, it is possible to perform encryption and decryption processes at high speed by reducing the amount of computations while maintaining a high security.

Furthermore, another encrypting device of the present invention includes:

key generation means for generating prime numbers p and q of which product is n=pq, where p is a private key, and generating as a public key $g_1$ given by the following Equation (1) using a random number s and a maximal generator g in a multiplicative group of integers modulo n; and encrypting arithmetic means for, in response to receipt of a plaintext m, generating a ciphertext C given by the following Equation (3)' using the public key $g_1$, a private key n and a random number r, $$g_1 = g^{s(p-1)} \pmod{n}, \quad (1)$$

$$C = m \cdot g_1^r \pmod{n}, \quad (3)'$$

where when information b is a size of p (bits), $0 < m < 2^{b-1}$ and $\gcd\{s, q-1\}=1$.

According to the above arrangement, a key $g_1$ generated as a public key includes the power of (p−1), and the ciphertext C generated using the public key $g_1$ also include the power of (p−1). This makes it possible to easily decrypt the ciphertext C using the Fermat's little theorem ($a^{p-1} \equiv 1 \pmod{p}$).

That is, the encrypting device of the present invention causes the key generation means to generate two large prime numbers p and q as a private key and to generate the public key $g_1$ so as to include the power of (p−1) by using the private key $\{p, q\}$ and the random numbers s and t.

As to the relation between the private key p and the size b, by limiting a length of the message m, and using this size b, it is possible to perform computation for the generation of a ciphertext and computation for decryption each by one equation, thus enabling encryption and decryption processes by simpler calculations without using the Chinese remainder theorem.

Further, as in the above arrangement, the ciphertext generated by the encrypting arithmetic means in the encrypting device of the present invention is given by the equation including the power of (p−1) using the public key $g_1$ and the private key n, so that it is possible to use the Fermat's little theorem for decryption of the ciphertext.

The Fermat's little theorem is given by $a^{p-1} \equiv 1 \pmod{p}$, and a number including the power of (p−1) modulo p is calculated, thereby reducing its remainder to "1".

Therefore, it is possible to generate the public key $g_1$ by simple calculations using a simple private key $\{p, q\}$, to generate a ciphertext by simple calculations, and to decrypt the ciphertext by simple calculations only using the Fermat's little theorem, thus enabling further higher-speed processing as compared to the conventional encryption scheme.

Meanwhile, in terms of security of the encrypting device of the present invention, the public key $g_1$ includes a random number s, so that the public key $g_1$ and the private key n are independent from each other.

Consequently, according to the encrypting device of the present invention, it is possible to realize high-speed encryption and decryption processes by reducing the amount of computations in such a manner limitations are imposed on the length of the plaintext m while maintaining a high security.

It is more preferable that e given by the following equation: e=h(d) (h is one-way hash function), where $d=(C_1 C_2)/m \pmod{n}$, is added to the ciphertext $C=(C_1, C_2)$ so as to be a ciphertext $C=(C_1, C_2, e)$.

This makes the ciphertext C longer. However, e changes if only a little change of the message m occurs, so that the cryptosystem of the present embodiment can be tolerable for the adaptive chosen-ciphertext attack (CCA2), thus obtaining a highly reliable cryptosystem.

Since e is computed using a hash function, e can reduce its amount of information to about 32 bits or 64 bits in length.

It is more preferable that included is a database for saving data resulting from calculation of a random number portion of the ciphertext C.

With this arrangement, for example, by previously preparing a database with two rows and f columns saving data of a random number portion to be included in the ciphertext C, in encrypting, it is possible to select a corresponding random number from this database to generate a ciphertext, thus realizing higher-speed encryption process.

Therefore, for example, as compared to the conventional RSA encryption scheme, it is possible to perform encryption process at higher speed by reducing the amount of computations, and to perform decryption only by calculation of modulo p. Therefore, it is possible to realize encryption and decryption at much higher speed, as compared to the conventional cryptosystem of the RSA encryption scheme with a large amount of computations.

It is more preferable that the encrypting arithmetic means encrypt only a first ciphertext element C into ciphertext elements $C_1$ and $C_2$ and generate subsequent ciphertext elements of the ciphertext element C, using the ciphertext element $C_1$ and two random numbers included in the ciphertext element $C_1$.

With this arrangement, only a first ciphertext element C is generated by an ordinary procedure, and for the subsequent ciphertext elements of the ciphertext element C, if a first bit $b_i=0$, a random number portion $R_1$ is added, or if a first bit $b_i=1$, a random number portion $R_2$ is added, thereby generating a ciphertext C.

Further, in a decrypting device of the present invention, included are decrypting arithmetic means for receiving a ciphertext $C=(C_1, C_2)$, which is an encrypted plaintext m, respectively given by the following Equations (3) and (4) using a public key $\{g_1, g_2\}$, a private key n, and random numbers r1 and r2, the private key n being n=pq where p and q are prime numbers generated as a private key, $g_1$ and $g_2$ being respectively given by the Equations (1) and (2) using two random numbers s and t and a maximal generator g in a multiplicative group of integers modulo n, and performing decryption in such a manner so as to generate received ciphertexts a and b respectively given by the following Equations (5) and (6) using the Fermat's little theorem and then derive the plaintext m satisfying the following Equation (7) from the received ciphertexts a and b using the Chinese remainder theorem, $$g_1 = g^{s(p-1)} \pmod{n}, \quad (1)$$

$$g_2 = g^{t(q-1)} \pmod{n}, \quad (2)$$

$$C_1 = m \cdot g_1^{r1} \pmod{n}, \quad (3)$$

$$C_2 = m \cdot g_2^{r2} \pmod{n}, \quad (4)$$

$$a = C_1 \pmod{p} = m \pmod{p}, \quad (5)$$

$$b = C_2 \pmod{q} = m \pmod{q}, \quad (6)$$

$$m = aAq + bBp \pmod{n}, \quad (7)$$

where gcd{s, q-1}=1, gcd{t, p-1}=1, Aq (mod p)=1, and Bp (mod q)=1.

According to the above arrangement, keys $g_1$ and $g_2$ generated as a public key respectively include the power of (p-1) and the power of (q-1), and the ciphertext elements $C_1$ and $C_2$ generated using the public key $\{g_1, g_2\}$ and the private key n also include the power of (p-1) and the power of (q-1), respectively. This makes it possible to easily decrypt the ciphertext elements $C_1$ and $C_2$ using the Fermat's little theorem ($a^{p-1} \equiv 1 \pmod{p}$)).

That is, the ciphertext received by the decrypting device of the present invention is given by the equations respectively including the power of (p-1) and the power of (q-1) using the public key $\{g_1, g_2\}$ and the private key n, so that it is possible to decrypt the ciphertext using the Fermat's little theorem.

The Fermat's little theorem is given by $a^{p-1} \equiv 1 \pmod{p}$, and a number including the power of (p-1) modulo p is calculated, thereby reducing its remainder to "1". Therefore, it is possible to compute two received ciphertexts corresponding to ciphertext elements $C_1$ and $C_2$ from the ciphertext elements $C_1$ and $C_2$ using the Fermat's little theorem and to decrypt the plaintext m from the two received ciphertexts using the Chinese remainder theorem.

As described above, the decrypting device of the present invention can decrypt a ciphertext easily using the Fermat's little theorem, thus enabling higher-speed decryption, as compared to the conventional decryption scheme.

Further, in another decrypting device of the present invention, included are decrypting arithmetic means for receiving a ciphertext C of an inputted plaintext m, given by the following Equation (3)' using a public key $g_1$ a private key n, and a random number r, the private key n being n=pq where p and q are prime numbers, p being generated as a private key, $g_1$ being given by the following Equation (1) using a random number s and a maximal generator g in a multiplicative group of integers modulo n, and performing decryption in such a manner so as to derive the plaintext m satisfying the following Equation (8) using the Fermat's little theorem, $$g_1 = g^{s(p-1)} \pmod{n}, \quad (1)$$

$$C = m \cdot g_1^{r} \pmod{n}, \quad (3)'$$

$$m = C \pmod{p}, \quad (8)$$

where gcd{s, q-1}=1.

According to the above arrangement, the ciphertext C generated using the public key $g_1$ includes the power of (p-1). This makes it possible to easily decrypt the ciphertext C using the Fermat's little theorem ($a^{p-1} \equiv 1 \pmod{p}$)).

That is, in the decrypting device of the present invention, as to the relation between the private key p and the size b, by limiting a length of the message m, and using this size b, it is possible to perform computation for the generation of a ciphertext and computation for decryption each by one equation, thus enabling decryption by simpler calculations without using the Chinese remainder theorem.

Further, the ciphertext decrypted by the decrypting device of the present invention is given by the equation including the power of (p-1) using the public key $g_1$, so that it is possible to use the Fermat's little theorem for decryption of the ciphertext.

The Fermat's little theorem is given by $a^{p-1} \equiv 1 \pmod{p}$, and a number including the power of (p-1) modulo p is calculated, thereby reducing its remainder to "1".

Therefore, it is possible to generate the public key $g_1$ and the private key n by simple calculations using a simple private key $\{p, q\}$, to generate a ciphertext by simple calculations, and to decrypt the ciphertext by simple calculations only using the Fermat's little theorem, thus enabling further higher-speed processing as compared to the conventional decryption scheme.

Note that, the present invention can be applied to distribution of an encryption key.

A cryptosystem of the present invention includes:

an encrypting device including: key generation means for generating two prime numbers p and q of which product is n=pq as a private key and generating as a public key $g_1$ and $g_2$ respectively given by the following Equations (1) and (2) using two random numbers s and t and a maximal generator g in a multiplicative group of integers modulo n; and encrypting arithmetic means for, in response to receipt of a plaintext m, generating a ciphertext $C=(C_1, C_2)$ respectively given by the following Equations (3) and (4) using the public key $\{g_1, g_2\}$, a private key n, and random numbers r1 and $r_2$; and a decrypting device including decrypting arithmetic means for receiving ciphertext elements $C_1$ and $C_2$ calculated by the encrypting device and performing decryption in such a manner so as to generate received ciphertexts a and b respectively given by the following Equations (5) and (6) using the Fermat's little theorem and then derive the plaintext m satisfying the following Equation (7) from the received ciphertexts a and b using the Chinese remainder theorem, $$g_1 = g^{s(p-1)} (\bmod\ n), \quad (1)$$

$$g_2 = g^{t(q-1)} (\bmod\ n), \quad (2)$$

$$C_1 = m \cdot g_1^{r_1} (\bmod\ n), \quad (3)$$

$$C_2 = m \cdot g_2^{r_2} (\bmod\ n) \quad (4)$$

$$a = C_1 (\bmod\ p) = m (\bmod\ p), \quad (5)$$

$$b = C_2 (\bmod\ q) = m (\bmod\ q), \quad (6)$$

$$m = aAq + bBp (\bmod\ n), \quad (7)$$

where $\gcd\{s, q-1\}=1$, $\gcd\{t, p-1\}=1$, $Aq\ (\bmod\ p)=1$, and $Bp\ (\bmod\ q)=1$.

According to the abovearrangement, in the encrypting device, keys g1 and g2 generated as a public key respectively include the power of (p-1) and the power of (q-1), and the ciphertext elements C1 and C2 generated using the public key {g1, g2 } and the private key n also include the power of (p-1) and the power of (q-1), respectively. This makes it possible for the decrypting device to easily decrypt the ciphertext elements C1 and C2 using the Fermat's little theorem ($a^{p-1} \equiv 1\ (\bmod\ p)$).

That is, the cryptosystem of the present invention includes an encrypting device and a decrypting device. The encrypting device includes and causes the key generation means to generate two large prime numbers p and q as a private key and to generate the public key $\{g_1, g_2\}$ so as to respectively include the power of (p−1) and the power of (q−1) by using the private key {p, q} and the random numbers s and t.

This makes it possible to directly use the two large prime numbers p and q as a private key and to compute the public key $\{g_1, g_2\}$ by very simple calculations including the power of (p−1) using a random number.

Further, in the encrypting device of the cryptosystem of the present invention, the encrypting arithmetic means generate the ciphertext C given by the equation including the power of (p−1) and the power of (q−1) using the public key $\{g_1, g_2\}$, so that it is possible to decrypt the ciphertext C using the Fermat's little theorem.

The Fermat's little theorem is given by $a^{p-1} \equiv 1\ (\bmod\ p)$, and a number including the power of (p−1) modulo p is calculated, thereby reducing its remainder to "1". Therefore, it is possible to compute two received ciphertexts corresponding to ciphertext elements $C_1$ and $C_2$ from the ciphertext elements $C_1$ and $C_2$ using the Fermat's little theorem and to decrypt the plaintext m from the two received ciphertexts using the Chinese remainder theorem.

As described above, in the cryptosystem of the present invention, it is possible for the encrypting device to generate the public key $\{g_1, g_2\}$ and the private key n by simple calculations using a simple private key {p, q} and to generate a ciphertext by simple calculations, and it is possible for the decrypting device to easily decrypt the ciphertext using the Fermat's little theorem, thus enabling higher-speed processing as compared to the conventional cryptosystem.

Meanwhile, in terms of security of the cryptosystem of the present invention, the public key $\{g_1, g_2\}$ generated by the encrypting device include random numbers s and t, respectively, so that the public key $\{g_1, g_2\}$ and the private key n are independent from each other.

Consequently, according to the cryptosystem of the present invention, it is possible to perform encryption and decryption processes at high speed by reducing the amount of computations while maintaining a high security.

Another cryptosystem of the present invention includes:

an encrypting device including: key generation means for generating prime numbers p and q of which product is n=pq, where p is a private key, and generating as a public key $g_1$ given by the following Equation (1) using a random number s and a maximal generator g in a multiplicative group of integers modulo n; and encrypting arithmetic means for, in response to receipt of a plaintext m, generating a ciphertext C given by the following Equation (3)' using the public key $g_1$, a private key n, and a random number r; and a decrypting device including decrypting arithmetic means for receiving the ciphertext C from the encrypting device and performing decryption in such a manner so as to derive the plaintext m satisfying the following Equation (8) using the Fermat's little theorem, $$g_1 = g^{s(p-1)} (\bmod\ n), \quad (1)$$

$$C = m \cdot g_1^{r} (\bmod\ n), \quad (3)'$$

$$m = C (\bmod\ p), \quad (8)$$

where $\gcd\{s, q-1\}=1$.

According to the above arrangement, the ciphertext C generated using the public key $g_1$ and the private key n by the encrypting device include the power of (p−1). This makes it possible for the decrypting device to easily decrypt the ciphertext C using the Fermat's little theorem ($a^{p-1} \equiv 1\ (\bmod\ p)$).

That is, the cryptosystem of the present invention causes the key generation means included in the encrypting device to generate two large prime numbers p and q as a private key and to generate the public key $g_1$ so as to include the power of (p−1) by using the private key {p, q} and the random numbers s and t.

As to the relation between the private key p and the size b, by limiting a length of the message m, and using this size b, the decrypting device can perform computation for the generation of a ciphertext and computation for decryption each by one equation, thus enabling decryption by simpler calculations without using the Chinese remainder theorem.

Further, in the cryptosystem of the present invention, the ciphertext decrypted by the decrypting device is given by the equation including the power of (p−1), so that it is possible to use the Fermat's little theorem for decryption of the ciphertext.

The Fermat's little theorem is given by $a^{p-1} \equiv 1 \pmod{p}$, and a number including the power of (p−1) modulo p is calculated, thereby reducing its remainder to "1".

Therefore, it is possible to generate the public key $g_1$ and the private key n by simple calculations using a simple private key {p, q}, to generate a ciphertext by simple calculations, and to decrypt the ciphertext by simple calculations only using the Fermat's little theorem, thus enabling further higher-speed processing as compared to the conventional decryption scheme.

Meanwhile, in terms of security of the cryptosystem of the present invention, the public key $g_1$ includes a random number s, so that the public key $g_1$ and the private key n are independent from each other.

Consequently, according to the encrypting device of the present invention, it is possible to realize high-speed processing by performing encryption and decryption processes by simpler calculations in such a manner limitations are imposed on the length of the plaintext m while maintaining a high security.

An encrypting method of the present invention includes the steps of:

generating two prime numbers p and q of which product is n=pq as a private key and generating as a public key $g_1$ and $g_2$ respectively given by the following Equations (1) and (2) using two random numbers s and t and a maximal generator g in a multiplicative group of integers modulo n; and in response to receipt of a plaintext m, generating ciphertext elements $C_1$ and $C_2$ respectively given by the following Equations (3) and (4) using the public key {$g_1$, $g_2$}, a private key n, and random numbers r1 and r2, $$g_1 = g^{s(p-1)} \pmod{n}, \quad (1)$$

$$g_2 = g^{t(q-1)} \pmod{n}, \quad (2)$$

$$C_1 = m \cdot g_1^{r_1} \pmod{n}, \quad (3)$$

$$C_2 = m \cdot g_2^{r_2} \pmod{n}, \quad (4)$$

where gcd{s, q−1}=1 and gcd{t, p−1}=1.

According to the above encrypting method, keys $g_1$ and $g_2$ generated as a public key respectively include the power of (p−1) and the power of (q−1), and the ciphertext elements $C_1$ and $C_2$ generated using the public key {$g_1$, $g_2$} and the private key n also include the power of (p−1) and the power of (q−1), respectively. This makes it possible to easily decrypt the ciphertext elements $C_1$ and $C_2$ using the Fermat's little theorem ($a^{p-1} \equiv 1 \pmod{p}$).

That is, the encrypting method of the present invention generates two large prime numbers p and q as a private key and generates the public key {$g_1$, $g_2$} so as to respectively include the power of (p−1) and the power of (q−1) by using the private key {p, q} and the random numbers s and t.

This makes it possible to directly use the two large prime numbers p and q as a private key and to compute the public key {$g_1$, $g_2$} by very simple calculations using a random number.

Further, the ciphertext generated by the encrypting method of the present invention is given by the equation including the power of (p−1) and the power of (q−1) using the public key {$g_1$, $g_2$} and the private key n, so that it is possible to decrypt the ciphertext using the Fermat's little theorem.

The Fermat's little theorem is given by $a^{p-1} \equiv 1 \pmod{p}$, and a number including the power of (p−1) modulo p is calculated, thereby reducing its remainder to "1". Therefore, it is possible to compute two received ciphertexts corresponding to ciphertext elements $C_1$ and $C_2$ from the ciphertext elements $C_1$ and $C_2$ using the Fermat's little theorem and to decrypt the plaintext m from the two received ciphertexts using the Chinese remainder theorem.

As described above, in the encrypting method of the present invention, it is possible to generate the public key {$g_1$, $g_2$} and the private key n by simple calculations using a simple private key {p, q}, to generate a ciphertext by simple calculations, and to decrypt the ciphertext by simple calculations using the Fermat's little theorem, thus enabling higher-speed processing as compared to the conventional encryption scheme.

Meanwhile, in terms of security of the encrypting method of the present invention, the public key {$g_1$, $g_2$} include random numbers s and t, respectively, so that the public key {$g_1$, $g_2$} and the private key n are independent from each other.

Consequently, according to the encrypting method of the present invention, it is possible to perform encryption and decryption processes at high speed by reducing the amount of computations while maintaining a high security.

Another encrypting method of the present invention includes the steps of:

generating prime numbers p and q of which product is n=pq, where p is a private key, and generating as a public key $g_1$ given by the following Equation (1) using a random number s and a maximal generator g in a multiplicative group of integers modulo n; and in response to receipt of a plaintext m, generating a ciphertext C given by the following Equation (3)' using the public key $g_1$, a private key n, and a random number r, $$g_1 = g^{s(p-1)} \pmod{n}, \quad (1)$$

$$C = m \cdot g_1^{r} \pmod{n}, \quad (3)'$$

where when information b is a size of p (bits), $0 < m < 2^{b-1}$ and gcd{s, q−1}=1.

According to the above encrypting method, a key $g_1$ generated as a public key includes the power of (p−1), and the ciphertext C generated using the public key $g_1$ and the private key n also includes the power of (p−1). This makes it possible to easily decrypt the ciphertext C using the Fermat's little theorem ($a^{p-1} \equiv 1 \pmod{p}$).

That is, the encrypting method of the present invention generates two large prime numbers p and q as a private key and generates the public key $g_1$ so as to include the power of (p−1) by using the private key {p, q} and the random numbers s and t.

As to the relation between the private key p and the size b, by limiting a length of the message m, and using this size b, it is possible to perform computation for the generation of a ciphertext and computation for decryption each by one equation, thus enabling encryption and decryption processes by simpler calculations without using the Chinese remainder theorem.

Further, as in the above encrypting method, the ciphertext generated by the encrypting method of the present invention is given by the equation including the power of (p−1) using the public key $g_1$, so that it is possible to use the Fermat's little theorem for decryption of the ciphertext.

The Fermat's little theorem is given by $a^{p-1} \equiv 1 \pmod{p}$, and a number including the power of (p−1) modulo p is calculated, thereby reducing its remainder to "1".

Therefore, it is possible to generate the public key $g_1$ by simple calculations using a simple private key {p, q}, to generate a ciphertext by simple calculations, and to decrypt the ciphertext by simple calculations only using the Fermat's little theorem, thus enabling higher-speed processing as compared to the conventional encrypting method.

Meanwhile, in terms of security of the encrypting method of the present invention, the public key $g_1$ includes a random number s, so that the public key $g_1$ and the private key n are independent from each other.

Consequently, according to the encrypting method of the present invention, it is possible to realize high-speed encryption and decryption processes by reducing the amount of computations while maintaining a high security.

A decrypting method of the present invention includes the steps of:

receiving a ciphertext $C=(C_1, C_2)$, which is an encrypted plaintext m, respectively given by the following Equations (3) and (4) using a public key $\{g_1, g_2\}$, a private key n, and random numbers r1 and r2, the private key n being n=pq where p and q are prime numbers generated as a private key, $g_1$ and $g_2$ being respectively given by the Equations (1) and (2) using two random numbers s and t and a maximal generator g in a multiplicative group of integers modulo n; and performing decryption in such a manner so as to generate received ciphertexts a and b respectively given by the following Equations (5) and (6) using the Fermat's little theorem and then derive the plaintext m satisfying the following Equation (7) from the received ciphertexts a and b using the Chinese remainder theorem, $$g_1 = g^{s(p-1)} (\text{mod } n), \quad (1)$$

$$g_2 = g^{t(q-1)} (\text{mod } n), \quad (2)$$

$$C_1 = m \cdot g_1^{r1} (\text{mod } n), \quad (3)$$

$$C_2 = m \cdot g_2^{r2} (\text{mod } n), \quad (4)$$

$$a = C_1 (\text{mod } p) = m (\text{mod } p), \quad (5)$$

$$b = C_2 (\text{mod } q) = m (\text{mod } q), \quad (6)$$

$$m = aAq + bBp (\text{mod } n), \quad (7)$$

where $\gcd\{s, q-1\}=1$, $\gcd\{t, p-1\}=1$, $Aq \pmod{p}=1$, and $Bp \pmod{q}=1$.

According to the above decrypting method, keys $g_1$ and $g_2$ generated as a public key respectively include the power of (p−1) and the power of (q−1), and the ciphertext elements $C_1$ and $C_2$ generated using the public key $\{g_1, g_2\}$ and the private key n also include the power of (p−1) and the power of (q−1), respectively. This makes it possible to easily decrypt the ciphertext elements $C_1$ and $C_2$ using the Fermat's little theorem ($a^{p-1} \equiv 1 \pmod{p}$).

That is, in the decrypting method of the present invention, the ciphertext is given by the equations respectively including the power of (p−1) and the power of (q−1) using the public key $\{g_1, g_2\}$ and the private key n, so that it is possible to decrypt the ciphertext using the Fermat's little theorem.

The Fermat's little theorem is given by $a^{p-1} \equiv 1 \pmod{p}$, and a number including the power of (p−1) modulo p is calculated, thereby reducing its remainder to "1".

Therefore, it is possible to compute two received ciphertexts corresponding to ciphertext elements $C_1$ and $C_2$ from the ciphertext elements $C_1$ and $C_2$ using the Fermat's little theorem and to decrypt the plaintext m from the two received ciphertexts using the Chinese remainder theorem.

As described above, since the decrypting device of the present invention can easily decrypt the ciphertext using the Fermat's little theorem, so that it is possible to perform high-speed processing, as compared to the conventional decryption scheme.

Another decrypting method of the present invention includes the steps of:

receiving a ciphertext C of an inputted plaintext m, given by the following Equation (3)' using a public key $g_1$, a private key n, and a random number r, the private key n being n=pq where p and q are prime numbers, p being generated as a private key, $g_1$ being given by the following Equation (1) using a random number s and a maximal generator g in a multiplicative group of integers modulo n; and performing decryption in such a manner so as to derive the plaintext m satisfying the following Equation (8) using the Fermat's little theorem, $$g_1 = g^{s(p-1)} (\text{mod } n), \quad (1)$$

$$C = m \cdot g_1^{r} (\text{mod } n), \quad (3)'$$

$$m = C (\text{mod } p), \quad (8)$$

where $\gcd\{s, q-1\}=1$.

According to the above decrypting method, the ciphertext C generated using the public key $g_1$ and the private key n includes the power of (p−1). This makes it possible to easily decrypt the ciphertext C using the Fermat's little theorem ($a^{p-1} \equiv 1 \pmod{p}$).

That is, in the decrypting method of the present invention, as to the relation between the private key p and the size b, by limiting a length of the message m, and using this size b, it is possible to perform computation for the generation of the ciphertext C and computation for decryption each by one equation, thus enabling decryption by simpler calculations without using the Chinese remainder theorem.

The ciphertext decrypted by the decrypting method of the present invention is given by the equation including the power of (p−1) using the public key $g_1$ and the private key n, so that it is possible to use the Fermat's little theorem for decryption of the ciphertext.

The Fermat's little theorem is given by $a^{p-1} \equiv 1 \pmod{p}$, and a number including the power of (p−1) modulo p is calculated, thereby reducing its remainder to "1".

Therefore, it is possible to generate the public key $g_1$ by simple calculations using a simple private key $\{p, q\}$, to generate a ciphertext by simple calculations, and to decrypt the ciphertext by simple calculations only using the Fermat's little theorem, thus enabling further higher-speed processing as compared to the conventional decryption scheme.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An encrypting device comprising:
key generation means for generating two prime numbers p and q of which product is n=pq as a private key and generating as a public key g1 and g2 respectively given by the following Equations (1) and (2) using two random numbers s and t and a maximal generator g in a multiplicative group of integers modulo n; and
encrypting arithmetic means for, in response to receipt of a plaintext m, generating a ciphertext C=(C1, C2)

respectively given by the following Equations (3) and (4) using the public key {g1, g2}, a private key n, and random numbers r1 and r2, $$g_1 = g^{s(p-1)} \pmod{n}, \quad (1)$$

$$g_2 = g^{t(q-1)} \pmod{n}, \quad (2)$$

$$C_1 = m \cdot g_1^{r1} \pmod{n}, \quad (3)$$

$$C_2 = m \cdot g_2^{r2} \pmod{n}, \quad (4)$$

where gcd{s, q−1}=1 and gcd{t, p−1}=1.

2. An encrypting device comprising:
key generation means for generating prime numbers p and q of which product is n=pq, where p is a private key, and generating as a public key g1 given by the following Equation (1) using a random number s and a maximal generator g in a multiplicative group of integers modulo n; and
encrypting arithmetic means for, in response to receipt of a plaintext m, generating a ciphertext C given by the following Equation (3)' using the public key g1, a private key n, and a random number r, $$g_1 = g^{s(p-1)} \pmod{n}, \quad (1)$$

$$C = m \cdot g_1^{r} \pmod{n}, \quad (3)'$$

where when b is a size of p (bits), $0 < m < 2^{b-1}$ and gcd{s, q−1}=1.

3. The encrypting device according to claim 1, wherein:
e given by the following equation: e=h(d) (h is one-way hash function), where d=($C_1$+$C_2$)/m (mod n), is added to the ciphertext C=($C_1$, $C_2$) so as to be a ciphertext C=($C_1$, $C_2$, e).

4. The encrypting device according to claim 1, further comprising:
a database for saving data resulting from calculation of a random number portion of the ciphertext C.

5. The encrypting device according to claim 1, wherein:
the encrypting arithmetic means encrypt only a plaintext element m1, which is a first element in the plaintext m, to the ciphertext element $C_1$=($C_{11}$, $C_{12}$), and ciphertext elements following the ciphertext element $C_1$ are generated using a received plaintext $m_i$, bit information of the plaintext $m_1$, and two random numbers $R_1$ or $R_2$ which are contained in the ciphertext $C_1$.

6. A decrypting device wherein included are decrypting arithmetic means for receiving a ciphertext C=($C_1$, $C_2$), which is an encrypted plaintext m, respectively given by the following Equations (3) and (4) using a public key {$g_1$, $g_2$}, a private key n, and random numbers r1 and r2, the private key n being n=pq where p and q are prime numbers generated as a private key, g1 and g2 being respectively given by the Equations (1) and (2) using two random numbers s and t and a maximal generator g in a multiplicative group of integers modulo n, and
performing decryption in such a manner so as to generate received ciphertexts a and b respectively given by the following Equations (5) and (6) using the Fermat's little theorem and then derive the plaintext m satisfying the following Equation (7) from the received ciphertexts a and b using the Chinese remainder theorem, $$g_1 = g^{s(p-1)} \pmod{n}, \quad (1)$$

$$g_2 = g^{t(q-1)} \pmod{n}, \quad (2)$$

$$C_1 = m \cdot g_1^{r1} \pmod{n}, \quad (3)$$

$$C_2 = m \cdot g_2^{r2} \pmod{n}, \quad (4)$$

$$a = C_1 \pmod{p} = m \pmod{p}, \quad (5)$$

$$b = C_2 \pmod{q} = m \pmod{q}, \quad (6)$$

$$m = aAq + bBp \pmod{n}, \quad (7)$$

where gcd{s, q−1}=1, gcd{t, p−1}=1, Aq (mod p)=1, and Bp (mod q)=1.

7. A decrypting device wherein included are decrypting arithmetic means for receiving a ciphertext C of an inputted plaintext m, given by the following Equation (3)' using a public key g1, a private key n, and a random number r, the private key n being n=pq where p and q are prime numbers, p being generated as a private key, g1 being given by the following Equation (1) using a random number s and a maximal generator g in a multiplicative group of integers modulo n, and
performing decryption in such a manner so as to derive the plaintext m satisfying the following Equation (8) using the Fermat's little theorem, $$g_1 = g^{s(p-1)} \pmod{n}, \quad (1)$$

$$C = m \cdot g_1^{r} \pmod{n}, \quad (3)'$$

$$m = C \pmod{p}, \quad (8)$$

where gcd{s, q−1}=1.

8. A cryptosystem comprising:
an encrypting device including: key generation means for generating two prime numbers p and q of which product is n=pq as a private key and generating as a public key g1 and g2 respectively given by the following Equations (1) and (2) using two random numbers s and t and a maximal generator g in a multiplicative group of integers modulo n; and encrypting arithmetic means for, in response to receipt of a plaintext m, generating a ciphertext C=($C_1$, $C_2$) respectively given by the following Equations (3) and (4) using the public key {$g_1$, $g_2$}, a private key n, and random numbers r1 and r2; and
a decrypting device including decrypting arithmetic means for receiving ciphertext elements $C_1$ and $C_2$ calculated by the encrypting device and performing decryption in such a manner so as to generate received ciphertexts a and b respectively given by the following Equations (5) and (6) using the Fermat's little theorem and then derive the plaintext m satisfying the following Equation (7) from the received ciphertexts a and b using the Chinese remainder theorem, $$g_1 = g^{s(p-1)} \pmod{n}, \quad (1)$$

$$g_2 = g^{t(q-1)} \pmod{n}, \quad (2)$$

$$C_1 = m \cdot g_1^{r1} \pmod{n}, \quad (3)$$

$$C_2 = m \cdot g_2^{r2} \pmod{n}, \quad (4)$$

$$a = C_1 \pmod{p} = m \pmod{p}, \quad (5)$$

$$b = C_2 \pmod{q} = m \pmod{q}, \quad (6)$$

$$m = aAq + bBp \pmod{n}, \quad (7)$$

where gcd{s, q−1}=1, gcd{t, p−1}=1, Aq (mod p)=1, and Bp (mod q)=1.

9. A cryptosystem comprising:
an encrypting device including: key generation means for generating prime numbers p and q of which product is n=pq, where p is a private key, and generating as a public key g1 given by the following Equation (1)

using a random number s and a maximal generator g in a multiplicative group of integers modulo n; and encrypting arithmetic means for, in response to receipt of a plaintext m, generating a ciphertext C given by the following Equation (3)' using the public key g1, a private key n, and a random number r; and a decrypting device including decrypting arithmetic means for receiving the ciphertext C from the encrypting device and performing decryption in such a manner so as to derive the plaintext m satisfying the following Equation (8) using the Fermat's little theorem, $$g_1 = g^{s(p-1)} \pmod{n}, \quad (1)$$

$$C = m \cdot g_1^r \pmod{n}, \quad (3)'$$

$$m = C \pmod{p}, \quad (8)$$

where $\gcd\{s, q-1\} = 1$.

10. An encrypting method comprising the steps of:

generating two prime numbers p and q of which product is n=pq as a private key and generating as a public key g1 and g2 respectively given by the following Equations (1) and (2) using two random numbers s and t and a maximal generator g in a multiplicative group of integers modulo n; and in response to receipt of a plaintext m, generating ciphertext elements C1 and C2 respectively given by the following Equations (3) and (4) using the public key {g1, g2}, a private key n, and random numbers r1 and r2, $$g_1 = g^{s(p-1)} \pmod{n}, \quad (1)$$

$$g_2 = g^{t(q-1)} \pmod{n}, \quad (2)$$

$$C_1 = m \cdot g_1^{r1} \pmod{n}, \quad (3)$$

$$C_2 = m \cdot g_2^{r2} \pmod{n}, \quad (4)$$

where $\gcd\{s, q-1\} = 1$ and $\gcd\{t, p-1\} = 1$.

11. An encrypting method comprising the steps of:

generating prime numbers p and q of which product is n=pq, where p is a private key, and generating as a public key g1 given by the following Equation (1) using a random number s and a maximal generator g in a multiplicative group of integers modulo n; and in response to receipt of a plaintext m, generating a ciphertext C given by the following Equation (3)' using the public key $g_1$, a private key n, and a random number r, $$g_1 = g^{s(p-1)} \pmod{n}, \quad (1)$$

$$C = m \cdot g_1^r \pmod{n}, \quad (3)'$$

where when b is a size of p (bits), $0 < m < 2^{b-1}$ and $\gcd\{s, q-1\} = 1$.

12. A decrypting method comprising the steps of:

receiving a ciphertext $C = (C_1, C_2)$, which is an encrypted plaintext m, respectively given by the following Equations (3) and (4) using a public key {g1, g2}, a private key n, and random numbers r1 and r2, the private key n being n=pq where p and q are prime numbers generated as a private key, g1 and g2 being respectively given by the Equations (1) and (2) using two random numbers s and t and a maximal generator g in a multiplicative group of integers modulo n; and performing decryption in such a manner so as to generate received ciphertexts a and b respectively given by the following Equations (5) and (6) using the Fermat's little theorem and then derive the plaintext m satisfying the following Equation (7) from the received ciphertexts a and b using the Chinese remainder theorem, $$g_1 = g^{s(p-1)} \pmod{n}, \quad (1)$$

$$g_2 = g^{t(q-1)} \pmod{n}, \quad (2)$$

$$C_1 = m \cdot g_1^{r1} \pmod{n}, \quad (3)$$

$$C_2 = m \cdot g_2^{r2} \pmod{n}, \quad (4)$$

$$a = C_1 \pmod{p} = m \pmod{p}, \quad (5)$$

$$b = C_2 \pmod{q} = m \pmod{q}, \quad (6)$$

$$m = aAq + bBp \pmod{n}, \quad (7)$$

where $\gcd\{s, q-1\} = 1$, $\gcd\{t, p-1\} = 1$, $Aq \pmod{p} = 1$, and $Bp \pmod{q} = 1$.

13. A decrypting method comprising the steps of:

receiving a ciphertext C of an inputted plaintext m, given by the following Equation (3)' using a public key g1, a private key n, and a random number r, the private key n being n=pq where p and q are prime numbers, p being generated as a private key, $g_1$ being given by the following Equation (1) using a random number s and a maximal generator g in a multiplicative group of integers modulo n; and performing decryption in such a manner so as to derive the plaintext m satisfying the following Equation (8) using the Fermat's little theorem, $$g_1 = g^{s(p-1)} \pmod{n}, \quad (1)$$

$$C = m \cdot g_1^r \pmod{n}, \quad (3)$$

$$m = C \pmod{p}, \quad (8)$$

where $\gcd\{s, q-1\} = 1$.

* * * * *